Aug. 3, 1937.  C. E. CARPENTER  2,088,946
DOUGHNUT COOKING DEVICE
Filed May 25, 1935  6 Sheets-Sheet 1

Inventor:
Charles E. Carpenter
By Parker & Carter
Attys.

Aug. 3, 1937.  C. E. CARPENTER  2,088,946
DOUGHNUT COOKING DEVICE
Filed May 25, 1935  6 Sheets-Sheet 2

Inventor.
Charles E. Carpenter.

Patented Aug. 3, 1937

2,088,946

UNITED STATES PATENT OFFICE 2,088,946

DOUGHNUT COOKING DEVICE

Charles E. Carpenter, Chicago, Ill.

Application May 25, 1935, Serial No. 23,360

22 Claims. (Cl. 53—7)

My invention relates to an improvement in cooking means applicable, for example, to doughnuts. One purpose is the provision of improved means for receiving raw, cut articles, such as doughnuts, and conveying them through a cooking cycle. Another purpose is the provision of means for preventing grease absorption in the heating of the doughnut. Another object is the provision of an improved method of cooking. Another object is the provision of improved means for equalizing the heat of cooking, throughout a cooking circuit. Another object is the provision of improved means for conveying the cooking articles through the circuit. Another object is the provision of improved means for delivering the articles to be cooked to a circuit. Another object is the provision of means for increasing the distance travelled of the cooking articles, without increasing the length of mechanical conveyers employed. Another object is the provision of improved means for circulating the cooking liquid. Other objects will appear from time to time in the course of the specification and claims.

I illustrate my invention more or less diagrammatically in the accompanying drawings, wherein—

Like parts are indicated by like symbols throughout the specification and drawings.

Figure 1:
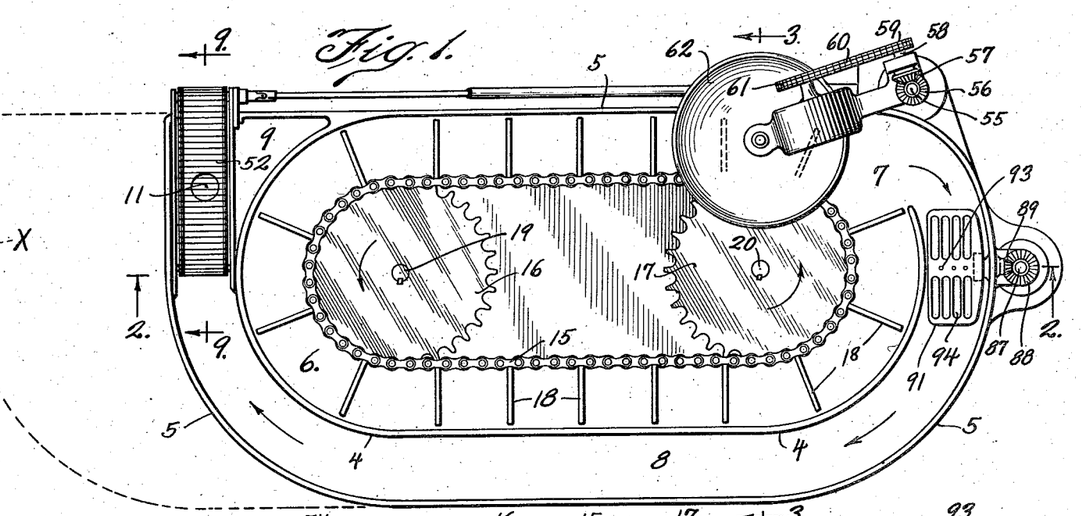
Figure 1 is a plan view.

Referring for example to Figure 1 and following, I generally indicates a cooking container heated in any suitable manner, for example by the gas heating members 2. The container 1 has an inner circumferential wall 3, an intermediate wall 4 and an outer circumferential wall 5. These walls are so formed as to define an inner channel generally indicated as 6 which communicates by an opening 7, and an outer channel 8 which terminates in the closed pocket or portion 9. A suitable level of heating fluid is maintained in this chamber and a circulation is obtained through the pipe 10 with its intake 11 in the pocket 9. It passes through a pump diagrammatically indicated as 12 and discharges as at 13 for communication with the inner passage 6. Thereby a positive circulation of the cooking liquid is obtained.

In order to convey the articles to be cooked through the circuit thus formed I provide a conveyor belt or chain 15 which passes about sprockets 16, 17 and carries a series of flights 18. The direction of travel is indicated by the arrows for example in Figure 1. Any suitable means may be employed for driving the sprockets but I illustrate sprocket shafts 19, 20 having worm gears 21, 22, secured to the lower ends thereof in mesh with the worms 23, 24 respectively, as shown in Figure 4, said worms being mounted on a shaft 25 which is driven through the bevel gear 26 and is rotatable in any suitable bearings 27 at each end thereof.

Figures 6, 9:
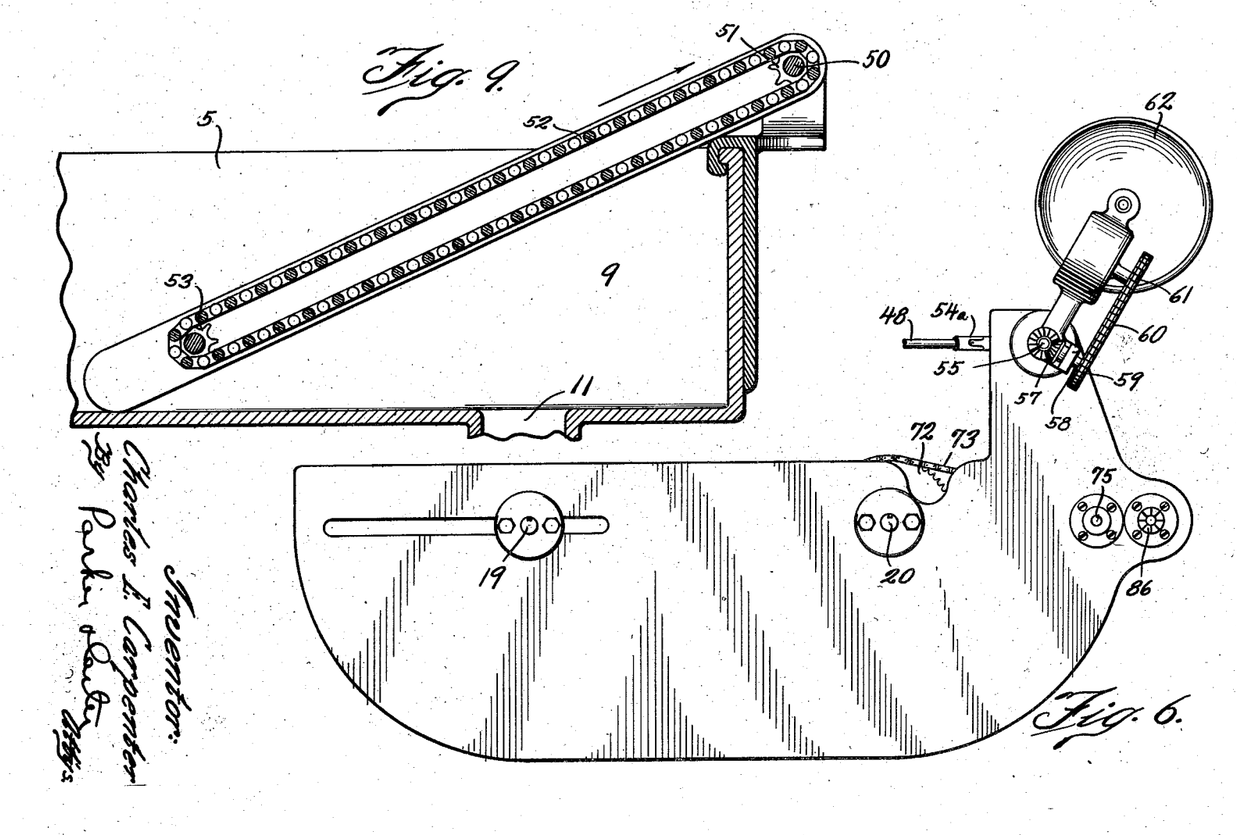
Figure 6 is a plan view.
Figure 9 is a vertical section through the means for removing the doughnuts from the cooking circuit.

30 is a motor or any suitable power source having a motor shaft 31 with an outer bearing 32. The motor shaft 30 carries a friction drive wheel 33 adjustable along the shaft 31. It is opposed to a disc 34 yieldably thrust as by the spring 35 which is compressed between the member 34 and the rotating member 36. Both are mounted on a shaft 37 which is driven, at variable speed, in response to the frictional engagement of the driving member 33 with the driven member 34. The speed may be varied by moving the member 33 toward or away from the axis of rotation of the disc 34 and thus of the shaft 37. The shaft 37 also carries a friction driver 40 which engages the opposed disc 41 mounted on the pump shaft 42 and thrust by the spring 43 against the driver 40. Thus the pump 12 may be driven at a controlled speed, the speed being controlled by movement of the member 40 along the shaft 37. The shaft 37 carries at its end a bevel gear 45 which in turn drives a bevel gear 47 on the telescope shaft 48. This shaft in turn, through any suitable intermediate mechanism, drives a shaft 50 which carries a sprocket 51 over which passes the conveyor 52 the lower end of which passes about the idler sprocket 53. This conveyor is located adjacent the pocket 9 and penetrates the level of the fluid, as shown in Figure 9 and serves to discharge the articles being cooked. As will be clear from Figure 2 the shaft 48 is upwardly inclined and is provided with a species of universal joint 54 at its upper end and a corresponding universal joint 54a at its lower end, whereby an inclined drive may be employed. It is illustrated as telescopically extensible, so that a longer cooking pan may be applied, if desired, without any change in the driving mechanism. The longer pan is illustrated in dotted line as at X in Figure 1.

The bevel gear 45 also is effective to drive any suitable feeding means for cutting or delivering doughnuts or the like to the cooking sequence. I illustrate, for example, the vertical shaft 55 with the bevel gear 56 at its upper end in mesh with an opposed bevel gear 57 on the shaft 58 which carries a sprocket 59 about which passes a drive chain 60 which in turn passes about a sprocket 61 which drives any suitable cutting or feeding mechanism generally indicated as 62, the details of which form no part of the present invention. It will be understood, as shown in Figure 6, that this feeding mechanism may be swung about the axis of the shaft 55.

Figures 3, 4:
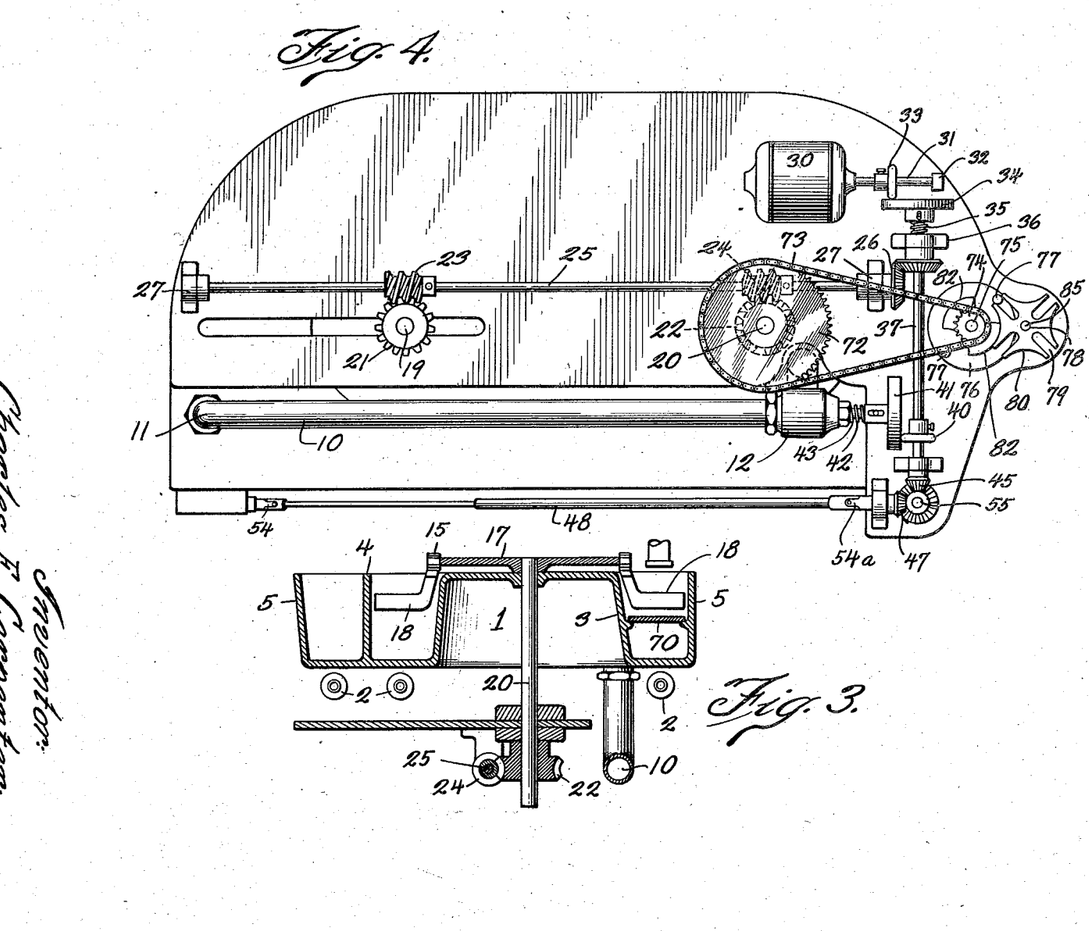
Figure 3 is a section on the line 3—3 of Figure 1.
Figure 4 is a bottom plan view.

In order to receive the initially dropped doughnuts, referring to the position of the parts as shown in Figure 3, I illustrate a receiving plate 70. As the doughnuts are initially dropped into the liquid they sink to the bottom and the plate 70 limits the downward movement of the doughnut. Almost immediately thereafter the doughnut swells up as it is subjected to the hot grease and floats to the surface and is picked up by one of the flights 18 and carried on through the cooking circuit.

Referring to Figure 1, the doughnut first makes a complete circuit about the channel 6, then passes out through the gateway 7, and reverses its direction, following the arrows as shown in Figure 1, and passes through the passage 8 to the discharge member 52. In this travel it is positively conveyed by the conveyor flights 18 as long as it passes along the passage 6. When it arrives opposite the gate 7 it is drawn by the circulation of the fluid, passes out from between the flights 18, reverses its direction, and is turned by the turning mechanism indicated at the right end of Figure 1.

Figure 2:
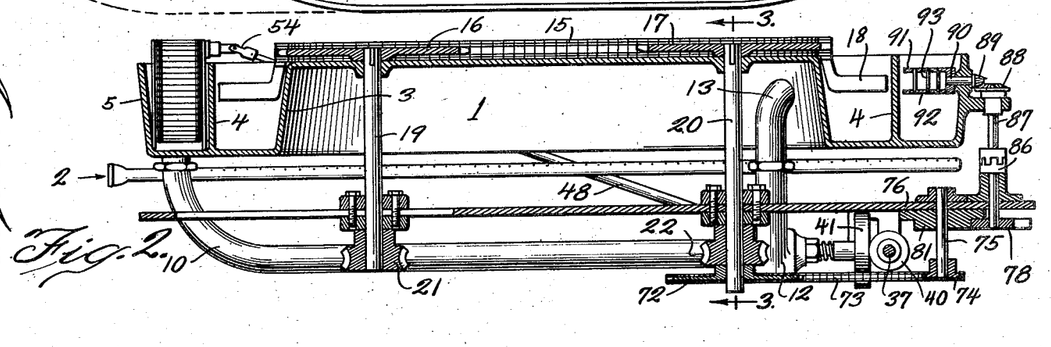
Figure 2 is a section on the line 2—2 of Figure 1.

Referring first to Figures 2 and 4, this mechanism is thus driven. The shaft 20, as shown in Figure 2, has at its lower end a sprocket 72 about which passes any suitable chain 73. This in turn passes about a smaller sprocket 74 on the vertical shaft 75 which carries at its upper end the following driving mechanism. A disc 76 is provided with pins 77 adapted to be opposed to slots 79, on a star wheel generally indicated as 78. The star wheel also has arcuate concavities 80 opposed to corresponding convex curved faces 82 on the member 81 associated with and forming a downward extension of the disc 76. The result of the relative rotation of the opposed parts is a step by step rotation of the vertical shaft 85 to which the star wheel is secured. This, through any suitable clutch mechanism 86, drives the vertical shaft 87, which has at its upper end a bevel gear 88 in mesh with the bevel pinion 89 of the shaft 90. 91 is the upper wall of any suitable turning member which is provided also with a lower wall 92 and limit wires 93. Both walls may be provided with apertures 94 to make them practically open work.

Figures 5, 7, 8:
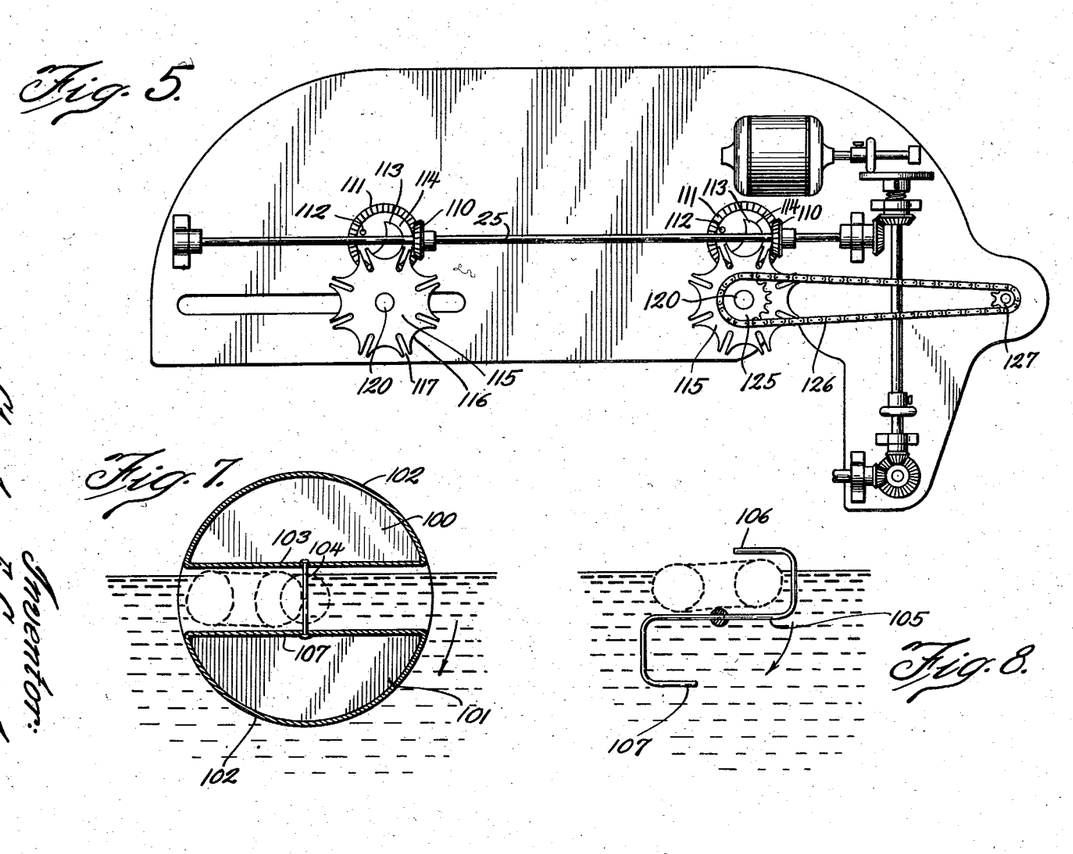
Figure 5 is a view similar to Figure 4 of a variant form of drive.
Figure 7 is a detail of the doughnut turning mechanism.
Figure 8 is a detail illustrating a variant form of such mechanism.

It will be understood that a wide variety of turning members may be employed and I illustrate, for example, in Figures 7 and 8, variant forms of turning devices. Figure 7 illustrates a turning member having an upper member 100 and a lower member 101. The outer surfaces of these are formed as at 102, to conform, in cross-section, to a circle. Inner opposed walls 103 are parallel. 104 are intermediate pins to limit the passage of the material therethrough. Figure 8 illustrates simply a series of hooked or re-turned wires 105 each of which has re-turned opposite ends 106, 107. In the case of each drawing, the direction of rotation is indicated by arrows and it will be understood that each member is turned through an arc of 180 degrees once for every advance of the flights 18. The drive of the flights may be continuous but a rotation of the reversing mechanism is preferably intermittent, to permit each doughnut to be trapped within the turning space before the turning member reverses it. As soon as it has been reversed there is nothing to prevent it from floating on beyond the turning device, and the fairly rapid circulation of the cooking grease obtains this effect.

If a step by step drive of the conveyor is desired, such a drive is shown in Figure 5, whereas the drive of Figure 4 illustrates a continuous drive for the conveyor and a step by step drive for the reversing mechanism. Referring to Figure 5 the shaft 25 has, instead of the worms 23, 24 of Figure 4, bevel gears 110. Each such gear is in mesh with a bevel gear 111 which in turn carries a pin 112 and a cut-away extension 113 with an outer circular wall 114. The wall 114 is opposed to corresponding curved faces 116 of the wheels 115. The wheels 115 are also provided with slots 117 adapted to receive the pin 112. The result is, in response to continuous rotation of the shaft 25, an intermittent or step by step rotation of the wheels 115. This thereby imparts intermittent or step by step rotation to the shafts 120 corresponding to the shafts 19 and 20 of Figure 2. The conveyor sprockets 16, 17 are thereby given a step by step rotation instead of continuous rotation. In such case the conveyor chain 15 moves step by step. There is no need for a separate step by step transmission for the reversing means. I therefore provide the sprocket 125 mounted on one of the shafts 120. About it passes a belt or chain 126 which drives the sprocket 127 and thereby the reversing means.

Figures 15, 17:
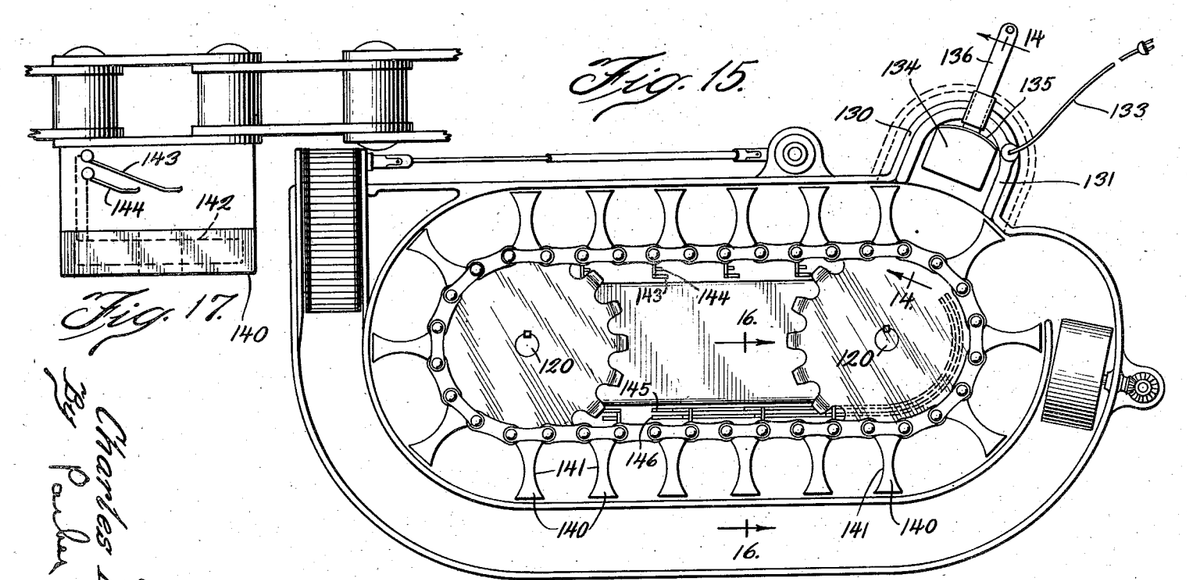
Figure 15 is a plan view of a variant form.
Figure 17 is a detail view taken on the line 17—17 of Figure 16.
Figure 16:
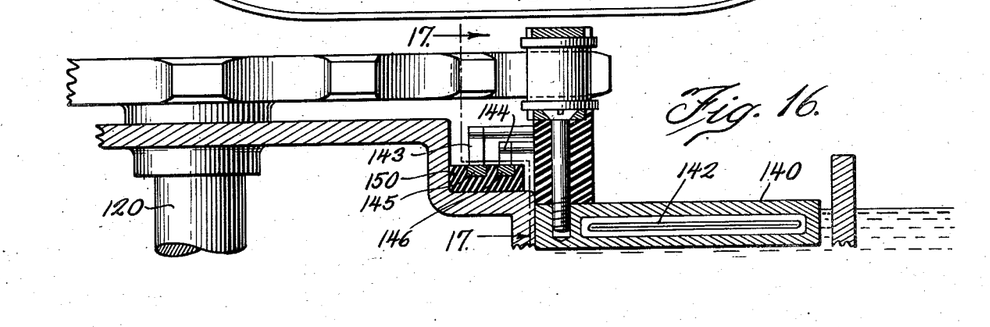
Figure 16 is a section on the line 16—16 of Figure 15.

Referring to the form of Figures 15, 16 and 17, I find it desirable to carry heat to the point at which the doughnut is received. The doughnut lands cold and raw in the liquid. I find it prevents or limits grease absorption to have the doughnut touch hot grease, grease heated to say 385 or 390 degrees. I illustrate means for controlling the heat to which the doughnut is subjected in the structure of Figures 15 and following. I may, for example, receive the doughnut in a separate pocket 130 which may be provided with a heating shoe 131. It may be heated by any suitable resistance means and I illustrate simply the contacts 132 in connection with the wire 133 to any suitable electric source. Whereas I have illustrated in Figure 15 the shoe 131 as seated in a closed pocket it will be understood that the shoe or heater may be recessed or apertured and that the pocket 130 may be so far enlarged as to permit the circulation of grease through the sides to the rear of the pocket and to the pocket as illustrated in dotted line in Figure 15.

In order to receive the doughnut and then to advance it into the normal driving circuit I illustrate a pusher member having a bottom receiving blade 134, a perforated side 135, a reciprocating arm 136, a lever 137 for actuating said reciprocating arm or slide, a link 138 for imparting periodic reciprocatory movement to the lever 137 and a disc 139 to which the link 138 is secured. Any suitable driving connection may be made between the disc 139 and the normal driving structure for the device. It will be understood that I do not wish to be limited to any specific means for heating the pocket 130, but find a removable resistance element, such as is shown in Figures 11, 14, and 15, useful.

Figures 10, 11, 12, 13, 14:
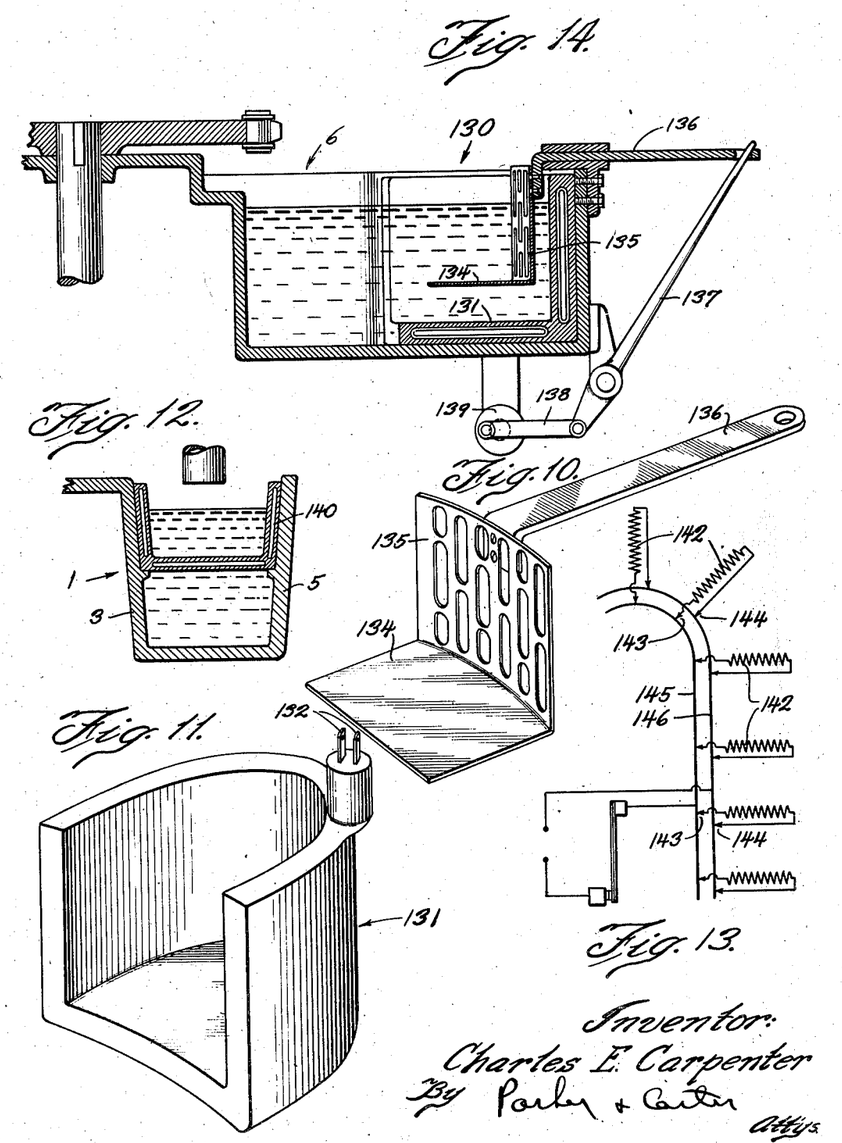
Figure 10 is a perspective view of one of the members shown in Figure 15.
Figure 11 is a perspective view of the heating element shown in Figure 15.
Figure 12 illustrates a variant form of heating mechanism.
Figure 13 is a wiring diagram.
Figure 14 is a partial vertical section on the line 14—14 of Figure 15.

I illustrate a slight variant in Figure 12 in which the heater may be positioned in the line of movement of the conveyor, instead of in a pocket. In such case, any suitable heater 140 may be employed, suitably connected with an electric circuit and a power source, and the pusher 134, 135, is in such case dispensed with.

I also may find it desirable to employ a variant type of conveyor flight which may either be positively heated electrically, or may be of such material, such as bronze, brass, or the like, as to receive and give off heat, to equalize the heat of the circuit to which the doughnuts are subjected. For example, I illustrate in Figure 15, a series of flights 140 shown as having curved concave walls 141 to conform to the doughnuts. These flights may be of considerable mass. If it is desired, however, to supplement their heating effect by actual heating means I may provide any suitable resistance heating member 142 in each such flight. Each such flight in such case is provided with a pair of slip contacts 143, 144, which may ride on contact rails 145, 146. The wiring diagram of such effect is illustrated in Figure 13. It will be understood that the actuating rails may be carried all the way around the device, if desired, so that all of the flights are practically continuously heated during their passage about the circuit. Or the heat may be intermittently applied at one or more points or zones. This is a matter simply of determining the length and location of the fixed contacts for the pick-up members 143, 144. The relationship of the members 143, 144, with the fixed contact rails is shown in Figure 16. The rails may be mounted, for example, in insulating blocks 150.

It will be realized that whereas I have described and shown a practical and operative device nevertheless many changes might be made in the size, shape, number and disposition of parts without departing from the spirit of my invention. I therefore wish my description and drawings to be taken as in a broad sense illustrative and diagrammatic rather than as limiting me to my specific showing.

It will be observed that, by the structure shown for example in Figures 1 and 15, the articles undergoing cooking are constrained to a tortuous path which includes the circuit through which they are carried by the conveyor and the return circuit 8 along which they are carried by the circulation of the fluid. The articles are positively conveyed, by the conveyor flights, throughout the first half of this tortuous path. Thereafter, they are conveyed along the passage 8 by the movement of the fluid itself. Closely adjacent the zone of escape of the cooking articles from the conveyor they are turned by the turning means shown for example at 91.

With reference to the structure of Figures 4 and 5 in order to vary the cooking of the doughnut and thus the color of the doughnut and also the speed of production of the doughnuts, the number of dozens per hour, it is possible to vary the speed of the movement of the doughnut through the conveyor. The drive for the positive conveyor may be varied by the adjustment including the member 33 adjustable along the motor shaft 31. There is also an adjustment for the drive of the pump namely the adjustment of the member 40 along the shaft 37. These may be adjusted separately and independently. In other words, it is possible by moving one or both of the members 33 and 40 to speed up the positive conveyor and slow the pump, to slow up the positive conveyor and speed the pump, or to speed both or to slow up both.

Referring to Figure 15 the heavy massive lugs shown become thoroughly heated, as they travel in hot grease through the part where the grease is hottest, at the far or left hand end of the vessel. When they return toward the pocket they are therefore already thoroughly heated. When a fresh doughnut blank is dropped into the hot grease of the pocket it tends to reduce the temperature of the grease about it. It may even tend to reduce it to the point where grease absorption takes place. The heavy massive heat retaining members 140 are therefore of value as their effective temperature is not perceptibly reduced by the arrival of the cold doughnut blank. On the contrary, being large masses of hot metal, they are effective to sear the raw dough and prevent heat absorption. They throw their heat out into the grease. It will be understood that the heat from the lugs pass out into the grease, and affects the articles being cooked. Experience indicates that these heavy flights very radically reduce the amount of cooking fluid per doughnut cooked. The result is a thin shell to the doughnut with a minimum of grease inside.

I claim:

1. In a cooking device, a container, a body of cooking liquid in the container, means for heating it, means for delivering the articles to be cooked to said container, a conveyor for conveying the articles through said container, and means for heating said conveyor.

2. In a cooking device, a container, a body of cooking liquid in the container, means for heating it, means for delivering the articles to be cooked to said container, a conveyor for conveying the articles through said container, said conveyor including a flexible member and a plurality of flights mounted thereon, and means for heating the individual flights of said conveyor.

3. In a cooking device, a container, a body of cooking liquid in the container, means for heating it, means for delivering the articles to be cooked to said container, a conveyor for conveying the articles through said container, and electrically operable means for heating said conveyor.

4. In a cooking device, a container, a body of cooking liquid in the container, means for heating it, means for delivering the articles to be cooked to said container, a conveyor for conveying the articles through said container, said conveyor including a flexible member and a plurality of flights mounted thereon, and electrically operable means for heating the flights of said conveyor.

5. A cooking container, a conveyor in said container and means for actuating it, a cooking liquid in said container, means for heating it, a pocket formed in said container out of the line of travel of the conveyor, means for delivering the articles to be cooked to said pocket, and means for moving them thence into the path of movement of the conveyor, and means for heating said pocket independently of the general heating of the container and liquid, and additional means for heating the conveyor.

6. In a cooking device, a container, means for defining a tortuous path in said container including an inner wall, having an inner passage on one side and an outer passage on the other, said wall having an opening therethrough to connect said passages, a conveyor and means for actuating it, said conveyor extending about the inner face of said wall, the container including an outer passage exterior to said wall and means for causing a circulation of the cooking liquid through said outer passage, effective during the operation of said conveyor in said inner passage.

7. In a cooking device, a container, means for defining a tortuous path in said container including an inner wall, having an inner passage on one side and an outer passage on the other, said wall having an opening therethrough to connect said passages, a conveyor and means for actuating it, said conveyor extending about the inner face of said wall, the container including an outer passage exterior to said wall and means for causing a circulation of the cooking liquid through said outer passage, effective during the operation of said conveyor in said inner passage, and means for withdrawing the cooked articles from said outer passage.

8. In a cooking device, a container, means for defining a tortuous path in said container including an inner wall, having an inner passage on one side and an outer passage on the other, said wall having an opening therethrough to connect said passages, a conveyor and means for actuating it, said conveyor extending about the inner face of said wall, the container including an outer passage exterior to said wall and means for causing a circulation of the cooking liquid through said outer passage, effective during the operation of said conveyor in said inner passage, and means for delivering the articles to be cooked to the inner passage for movement by the said conveyor.

9. In a cooking device, a container, means for defining a tortuous path in said container including an inner wall, having an inner passage on one side and an outer passage on the other, said wall having an opening therethrough to connect said passages, a conveyor and means for actuating it, said conveyor extending about the inner face of said wall, the container including an outer passage exterior to said wall and means for causing a circulation of the cooking liquid through said outer passage, effective during the operation of said conveyor in said inner passage, and a turning device for turning the articles as they pass along the outer passage with the cooking liquid.

10. In a cooking device, a container, a body of cooking liquid in said container, means for heating it, means for delivering the articles to be cooked to said liquid, means for moving them through said container, and means for turning them, including a rotor the axis of rotation of which is adjacent the surface of the liquid, said rotor having exterior portions of generally cylindrical form.

11. In a cooking container, a conveyor in said container, including a belt, sprockets for said belt rotatable about vertical axes and flights extending outwardly from said belt, means for actuating said conveyor, a cooking liquid in said container, means for heating it, a pocket formed in the container wall, laterally out of the line of travel of the conveyor, and means for delivering the articles to be cooked to said pocket, and means for expelling said articles from said pocket and into the path of movement of the conveyor.

12. In a cooking container, a conveyor in said container, including a belt, sprockets for said belt rotatable about vertical axes and flights extending outwardly from said belt, means for actuating said conveyor, a cooking liquid in said container, means for heating it, a pocket formed in the container wall, laterally out of the line of travel of the conveyor, and means for delivering the articles to be cooked to said pocket, and means for expelling said articles from said pocket and into the path of movement of the conveyor, and including a thrust member associated with said pocket, and means for reciprocating it.

13. In a cooking container, a conveyor in said container, including a belt, sprockets for said belt rotatable about vertical axes and flights extending outwardly from said belt, means for actuating said conveyor, a cooking liquid in said container, means for heating it, a pocket formed in the container wall, laterally out of the line of travel of the conveyor, and means for delivering the articles to be cooked to said pocket, and means for expelling said articles from said pocket and into the path of movement of the conveyor, and additional means for separately heating said pocket.

14. In a cooking device, a container, a body of cooking liquid in the container, means for heating it, means for delivering the articles to be cooked to said container, a conveyor in said container adapted to receive and convey the articles being cooked, and pumping means for circulating the cooking liquid in said container, and independent means for varying the speed of the conveyor and the effectiveness of the pumping means.

15. In a doughnut machine or the like of the flotation type, the combination of a channel shaped cooking vessel adapted to contain frying liquid and having primary and secondary sections joined together and along which the frying doughnuts travel in sequence, means for turning the doughnuts at the point of joinder of the primary and secondary sections aforesaid, a conveyor having individual pockets for doughnuts and located and traveling in the primary section aforesaid, means for forming and delivering dough batches into the pockets of said conveyor, and means for circulating liquid along the secondary section aforesaid to carry the turned doughnuts along the same, whereby the doughnuts are positively retained in separate positions in the conveyor pockets during the initial frying operation on one side, and until they are given permanent form, and capable of retaining such form during the subsequent flotation frying on their other side in the secondary section, substantially as described.

16. In a doughnut machine or the like of the flotation type, the combination of a cooking vessel adapted to contain frying liquid and having primary and secondary sections joined together and along which the frying doughnuts travel in sequence, means for turning the doughnuts at the point of joinders of the primary and secondary sections aforesaid, a conveyor for doughnuts located and traveling in the primary section aforesaid, means for forming and delivering dough batches into said conveyor, and means for circulating liquid along the secondary section aforesaid to carry the turned doughnuts along the same, whereby the doughnuts are positively retained in positions in the conveyor during the initial frying operation on one side, and until they are given permanent form, and capable of retaining such form during the subsequent flotation frying on their other sides in the secondary section, substantially as described.

17. In a doughnut machine or the like of the flotation type, the combination of a cooking vessel adapted to contain frying liquid and having primary and secondary sections joined together and along which the frying doughnuts travel in sequence, a conveyor for positively moving doughnuts along the primary section, pumping means for circulating frying liquid along the secondary section to carry the doughnuts along said section by flotation, means for driving the conveyor and the pumping means, and means for varying the relative speeds of the conveyor and the pumping means to thereby relatively control the same, substantially as described.

18. In a doughnut machine or the like having a doughnut former and dropper and a turner and a conveyor, said conveyor including a drive member working on a fixed center, and a doughnut delivering device, and a pan for frying grease and in which pan the conveyor and delivery devices are located and operate, the conveyor including a second drive member located in said pan, together with drive connections between the second drive member and the delivery device, and the first drive member, the turner and the doughnut former and dropper, said drive connections being of variable length according to the size of the pan, substantially as described.

19. In a doughnut machine of the flotation type, a channel shaped pan for hot frying grease, a conveyor located and working in one portion of said pan, a turner located in the pan adjacent to the delivery point of said conveyor and out of the path of travel of the conveyor, a circulation connection for hot grease from one point of the pan to deliver the hot grease into the pan adjacent to the conveyor delivery point, and means for ensuring flow of hot grease through said connection, whereby the so delivered hot grease floats the doughnuts from the conveyor to the turner, substantially as described.

20. In a cooking device, a container, a body of cooking liquid in said container, means for heating it, means for delivering articles to be cooked to said liquid, a conveyor adapted to convey articles along said container, means for actuating it, and additional means for imparting movement to said articles along said container, along a path removed from said conveyor, including means for imparting circulation to the liquid in said container, and turning means for turning said articles, positioned adjacent the point of delivery of said articles from said conveyor.

21. A cooking container, a conveyor in said container and means for actuating it, a cooking liquid in said container, means for heating it, a pocket formed in said container, laterally out of line of the travel of the conveyor, means for delivering the articles to be cooked to said pocket, and means for moving them thence into the path of movement of the conveyor, including a reciprocating pusher having a generally horizontal member adapted to receive the freshly delivered articles, and an upstanding portion associated therewith adapted to thrust them laterally, and means for reciprocating said member.

22. A cooking container, a conveyor in said container, and means for actuating it, a cooking liquid in said container, means for heating it, a pocket formed in said container out of the line of travel of the conveyor, means for delivering raw articles to be cooked to said pocket, means for moving them thence into the path of movement of the conveyor, and means for heating said pocket independently of the general heating of the container and liquid, and to a higher temperature.

CHARLES E. CARPENTER.